US011870712B1

(12) United States Patent
Kumar

(10) Patent No.: US 11,870,712 B1
(45) Date of Patent: Jan. 9, 2024

(54) DISTRIBUTED NETWORK MANAGEMENT

(71) Applicant: Amazon Technologies, Inc., Seattle, WA (US)

(72) Inventor: Surendra Kumar, San Ramon, CA (US)

(73) Assignee: Amazon Technologies, Inc., Seattle, WA (US)

(*) Notice: Subject to any disclaimer, the term of this patent is extended or adjusted under 35 U.S.C. 154(b) by 47 days.

(21) Appl. No.: 17/110,888

(22) Filed: Dec. 3, 2020

(51) Int. Cl.
*H04L 49/90* (2022.01)
*H04L 67/10* (2022.01)
*H04L 67/60* (2022.01)

(52) U.S. Cl.
CPC .............. *H04L 49/90* (2013.01); *H04L 67/10* (2013.01); *H04L 67/60* (2022.05)

(58) Field of Classification Search
CPC .......... H04L 49/90; H04L 67/32; H04L 67/10
See application file for complete search history.

(56) References Cited

U.S. PATENT DOCUMENTS

| | | | | |
|---|---|---|---|---|
| 2014/0281043 | A1* | 9/2014 | Jokinen | G06F 13/126 710/5 |
| 2015/0106463 | A1* | 4/2015 | Kruglick | G06F 9/546 709/206 |
| 2018/0032323 | A1* | 2/2018 | Roy | G06F 8/65 |
| 2019/0347005 | A1* | 11/2019 | Lamba | G06F 3/0619 |
| 2020/0314213 | A1* | 10/2020 | Dukhovny | H04L 67/14 |
| 2021/0181989 | A1* | 6/2021 | Jung | G06F 3/067 |

* cited by examiner

Primary Examiner — Nicholas R Taylor
Assistant Examiner — Sanjoy Roy
(74) Attorney, Agent, or Firm — Klarquist Sparkman, LLP

(57) ABSTRACT

Technologies are provided for distributed network management. An access-point computing device is configured to receive commands that target network devices in different computer networks. When a command is received, the access-point device determines which network is targeted by the command and stores the command in a queue associated with that network. Other computing devices are configured to access the multiple computer networks and to execute commands that target devices in the multiple networks. These other computing devices can be configured to transmit requests for commands to the access-point device. When such a request is received, the access-point device determines which network the request is for, retrieves a command from the queue associated with the computer network, and transmits the command to the requestor. The requestor, upon receipt of the command, executes the command against network device(s) in the computer network and transmits any result back to the first computing device.

18 Claims, 6 Drawing Sheets

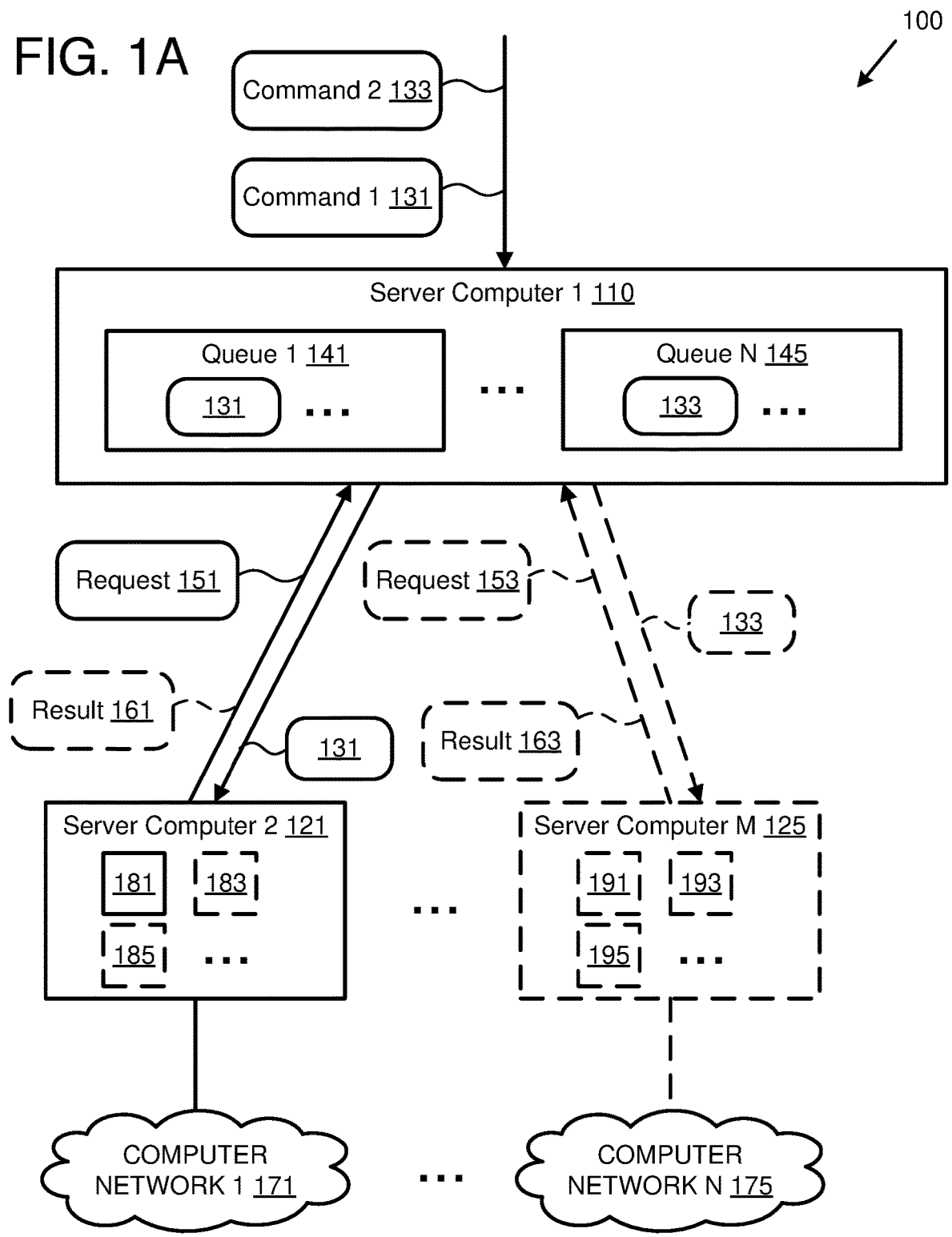

DISTRIBUTED NETWORK MANAGEMENT

BACKGROUND

At least some computer network systems provide capabilities for managing network devices in the computer network systems. Such capabilities include the ability to monitor status information for devices in the computer network systems, and the ability to configure such devices. In at least some cases, managing multiple computer network systems requires accessing separate toolsets via different access points.

BRIEF DESCRIPTION OF THE DRAWINGS

FIGS. 1A-B are system diagrams depicting an example system configured for distributed network management.

DETAILED DESCRIPTION

Figure 1B:
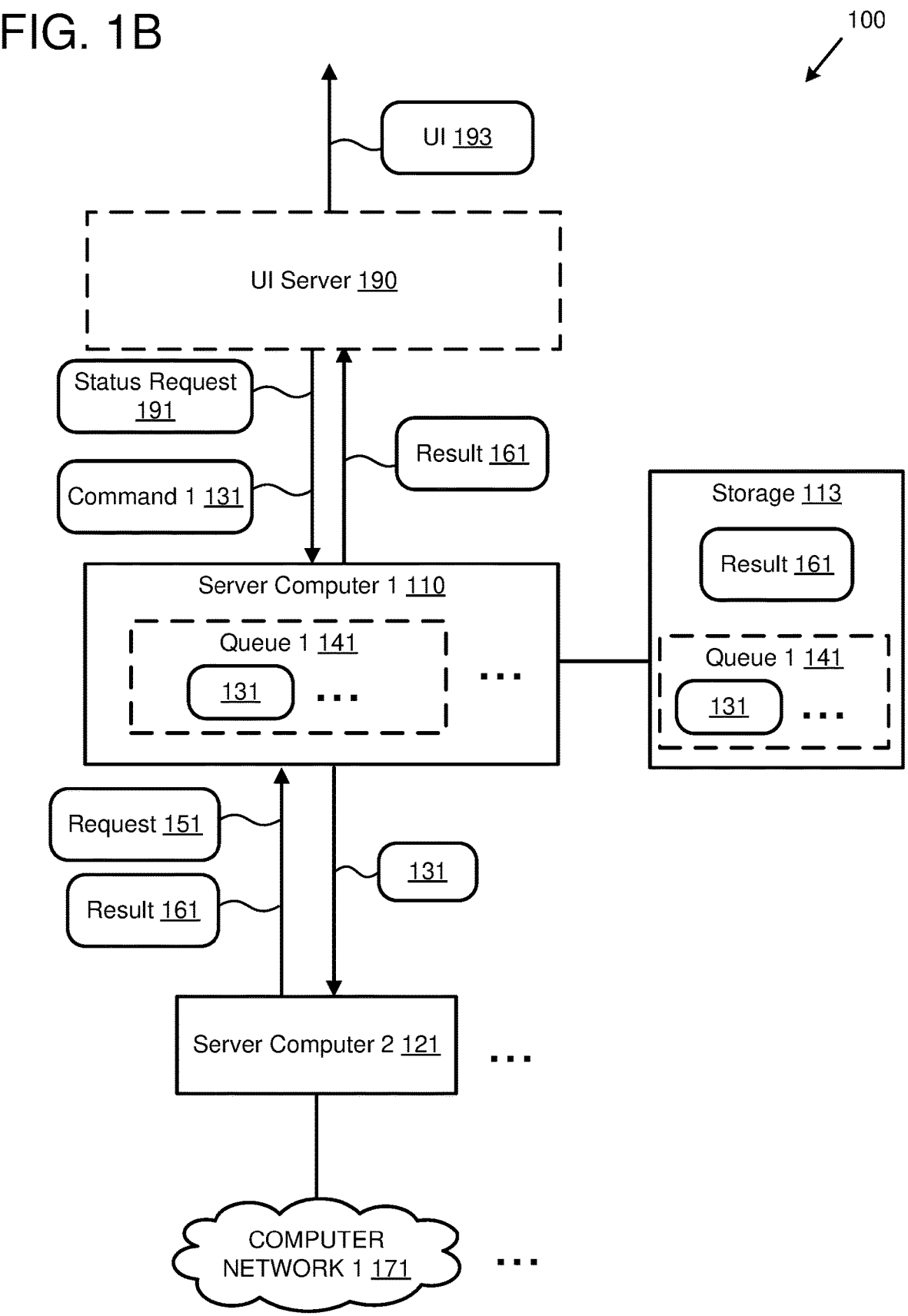

The following description is directed to technologies for distributed network management. In some cases, managing multiple computer networks can be burdensome. In scenarios where the computer networks are non-uniform, managing them may require using separate toolsets and separate access points. As the number of networks under management increases, the burden of using different toolsets and access points becomes more pronounced. This burden could be eased by providing a single, unified access point for managing multiple networks. However, providing a single access point that has the capability to directly access multiple, separate networks may not be feasible, or even possible, in some cases. For example, establishing such a unified access point may introduce security risks or violate service agreements. Additionally, an access point that integrates directly with multiple networks may be too costly to develop or may create a bottleneck for network management tasks.

At least some of the embodiments of the technologies described herein solve these problems by providing an access-point computing device (such as a server computer), which can receive commands that target network devices in different networks. The access-point computing device can maintain multiple queues associated with multiple networks. When a command is received, the access-point computing device determines which network contains the device (or devices) targeted by the command and stores the command in the queue associated with that network. Other computing devices (such as other server computers) are configured to access the multiple computer networks and to execute commands that target devices in the multiple networks. These other computing devices are configured to send work requests to the access-point computing device. When such a request is received, the access-point computing device determines which network is associated with the requesting computing device, retrieves a command from the queue associated with that computer network, and transmits the command to the requesting computing device. The requesting computing device, upon receipt of the command, executes the command against network device(s) in its computer network and transmits any result back to the access-point computing device.

Thus, in at least some cases, a single access point can be provided which allows users to manage multiple networks of different types, in different geographic locations, and/or with different security needs without the users having to be aware of these differing details. Also, in at least some cases, separate networks can continue to operate with separate toolsets without impacting the access point since the networks can be connected to separate server computers that can be configured to work with the separate toolsets. Also, isolation can be maintained between separate networks since the access point does not directly access any of the networks. Additionally, in at least some cases, virtual networks can be dynamically created and destroyed (for example for testing purposes) without needing to change the behavior of the access point.

In at least some embodiments, the computing devices connected to the separate networks can host multiple processes that are configured to request work from the access point computing device and to execute received commands against devices in the separate networks. The number of processes instantiated can be scaled up or down to address changes in command volume for particular networks. Also, in at least some cases, the processes can be terminated to quickly cut off access to a given network in order to address a security threat.

FIG. 1A is a system diagram depicting an example system 100 configured for distributed network management. The example system 100 comprises a first server computer 110 that comprises a plurality of queues 141-145 associated with a plurality of computer networks 171-175. Although two computer networks (171 and 175) and two queues (141 and 145) are depicted, any number of computer networks and corresponding queues are possible. Furthermore, it is also possible for different numbers of queues to be associated with different numbers of networks. For example, a single queue may be associated with more than one network in some scenarios. Additionally or alternatively, more than one queue may be associated with the same computer network. For example, multiple queues may be dedicated to different types of commands and/or different groups of network devices within a network.

The first server computer 110 is configured to receive a first command 131, wherein the first command 131 targets a network device (not shown) in the computer network 171. The first server computer 110 can be configured to determine the network, of the plurality of networks 171-175, to which the network device targeted by the first command 131 belongs. For example, the command 131 can comprise an identifier for the network device that is targeted by the command 131. In at least some embodiments, the server computer 110 can be configured to analyze the identifier for the network device in order to ascertain the network, of the plurality of networks 171-175, to which the network device belongs. For example, identifiers for network devices in the plurality of networks 171-175 can be assigned using a naming scheme in which a name of a network is used as part of names of network devices contained within the network.

In the particular example depicted in FIG. 1A, the server computer 110 determines that the first command 131 targets a network device contained within the computer network 171. The server computer 110 can be configured to store the command 131 in a queue associated with the computer network 171 (in this example, the queue 141). The server computer 110 can be configured to maintain the queues 141-145 in one or more memories (not shown) and/or one or more computer-readable storages (not shown) of the server computer 110. The queues 141-145 can comprise data structures in which commands (e.g., 131 and 133) can be stored in a particular order. For example, the server computer 110 can be configured to store commands targeting devices in a particular network in the queue associated with that network using a first-in first-out (FIFO) storage technique, in which newer commands are added to the back of the queue and commands are retrieved from the front of the queue. Using such a technique, commands are processed from the queue in the order that they are added to the queue. Alternatively, the server computer 110 can be configured to store commands targeting devices in a particular network in the queue associated with that network using a last-in first-out (LIFO) storage technique, in which newer commands are added to the front of the queue and commands are retrieved from the front of the queue. Using such a technique, commands are processed from the queue in an opposite order from the order they are added to the queue. Other processing techniques are also possible.

The server computer 110 can be configured to receive a second command 133 that targets a network device (not shown) in another computer network, of the plurality of computer networks 171-175. For example, the server computer 110 can determine that the command 133 targets a network device in the computer network 175. The server computer 110 can then store the command 133 in a queue associated with the computer network 175 (here depicted as the queue 145).

The server computer 110 can be configured to buffer commands in the queues 141-145 until a server computer (or a process executing on a server computer) is available to process one or more of the commands. In at least some embodiments, the server computer 110 is configured to receive requests for work (e.g., 151 and 153) from server computers (e.g., 121-125) that are associated with the computer networks 171-175.

The example system 100 comprises a second server computer 121 that comprises a worker process 181. The worker process 181 can comprise one or more hardware and/or software components of the server computer 121. For example, the worker process 181 can comprise executable instructions that are executed by one or more processors (not shown) of the server computer 121 and which cause the server computer 121 to perform operations as described herein.

The worker process 181 can be configured to transmit a request for work 151 to the server computer 110. For example, the worker process 181 can be configured to request commands from the server computer 110, to receive those commands from the server computer 110, and to execute the received commands against network devices in one or more computer networks with which the server computer 121 is associated (e.g., the computer network 171).

The server computer 110 can be configured to receive the request 151 from the server computer 121 and to determine that the server computer 121 (and/or the worker process 181) is associated with the computer network 171. For example, the request 151 can comprise an identifier associated with the server computer 121 and/or the worker process 181. The server computer 110 can be configured to analyze the identifier contained in the request 151 and to determine, based on the contents of the identifier, which network (or networks), of the plurality of networks 171-175, the server computer 121 (and/or the worker process 181) is associated.

In the particular example depicted in FIG. 1A, the server computer 110 determines, based on the contents of the request 151 that the server computer 121 is associated with the computer network 171.

After determining that the server computer 121 (and/or the worker process 181) is associated with the computer network 171, the server computer 110 can retrieve the command 131 from the queue 141 associated with the computer network 171 and can transmit the command 131 to the server computer 121. The worker process 181 can be configured to receive the command 131 from the server computer 110 and to execute the command 131 against the network device in the computer network 171.

In at least some scenarios, commands can target more than one device in a computer network. In such scenarios, one or more worker processes (e.g., 181) can be configured to execute the command against each device in the computer network that is targeted by the command.

Optionally, the example system 100 can comprise a third server computer 125 that is associated with another computer network, of the plurality of computer networks 171-175. For example, the server computer 125 can be associated with the computer network 175. The server computer 125 can comprise a worker process (e.g., 191) that is configured to transmit a request for work 153 to the server computer 110. The server computer 110 can be configured to receive the request 153 and to determine that the server computer 125 (and/or the worker process (e.g., 191)) is associated with the computer network 175. The server computer 110 can remove the command 133 from the queue 145 associated with the computer network 175, and can transmit the command 133 to the server computer 125. The worker process (e.g., 191) can be configured to receive the command 131 and to execute the command 133 against the network device in the computer network 175 that is targeted by the command 133.

Thus, in at least some scenarios, commands targeting network devices in the separate computer networks 171-175 can be distributed amongst multiple server computers 121-125 that are associated with the separate computer networks 171-175. Although a single server computer 121 is depicted as being associated with the computer network 171, and a single server computer 125 is depicted as being associated with the computer network 175, in at least some embodiments it is possible for more than one server computer to be associated with a given computer network and/or for a given server computer to be associated with more than one computer network.

Additionally or alternatively, the server computer 110 can be configured to consider command priorities when determining command order within one or more of the queues 141-145. For example, subsequent to receiving the command 131, if the server computer 110 receives another command (not shown) targeting a network device within the computer network 171 then, when determining a position of the newly received command in the queue 141, the server computer 110 can consider relative priorities of the command 131 and the newly received command. If the server computer 110 determines that the newly received command has a higher priority than the command 131, then the server computer 110 can insert the newly received command in the queue 141 in a position that will ensure that the newly received command is retrieved from the queue 141 in response to a request for work before the command 131 is retrieved from the queue 141.

In at least some embodiments, the server computer 121 can comprise the worker process 181 and one or more additional worker processes (e.g., 183 and 185). Additionally or alternatively, the server computer 125 can comprise multiple worker processes (e.g., 191-195). In at least some such embodiments, the worker processes 181-185 can be configured to transmit requests for work to the server computer 110. The worker processes 181-185 can be associated with a same computer network (e.g., 171) and/or with different computer networks.

Additionally or alternatively, the server computer 110 can be configured to transmit a command (not shown) to the server computer 121 to create one or more additional worker processes (e.g., 183 and/or 185). For example, the server computer 110 can be configured to monitor command activity for a given computer network and to transmit a command to create one or more additional worker processes to one or more server computers associated with the computer network when the command activity exceeds a specified threshold. For example, the server computer 110 can monitor a backlog of commands in the queue 141 associated with the computer network 171. If the backlog of commands exceeds a specified threshold, the server computer 110 can transmit a command to the server computer 121 (and/or one or more other server computers associated with the computer network 171) to create one or more additional worker processes.

In at least some embodiments, different worker processes in a given server computer (e.g., 121) can be associated with different subnets within a given network. In such an embodiment, the server computer 110 can comprise separate queues (not shown) associated with the different subnets.

Optionally, the server computer 110 can be configured to receive a result 161 of the execution of the command 131 from the server computer 121. Additionally or alternatively, the server computer 110 can receive a result 163 of the execution of the command 133 from the server computer 125. In at least some embodiments, such results can be stored in a storage associated with the server computer 110.

FIG. 1B as another system diagram depicting the example system 100, in which the server computer 110 is connected to a computer-readable storage 113. Some details of the example system 100 are omitted from FIG. 1B for the sake of clarity. In the example depicted in FIG. 1B, the server computer 121 is configured to transmit the result 161 of the execution of the command 131 to the server computer 110. The server computer 110 is configured to store the result 161 in the storage 113. In at least some embodiments, the server computer 110 can be configured to store results of multiple commands in the storage 113.

Additionally or alternatively, the server computer 110 can be configured to transmit the result 161 as part of a response. For example, the example system 100 can comprise another server computer 190 that is configured to transmit the command 131 to the server computer 110. Although not depicted, the server computer 190 can be configured to transmit the command 133 (depicted in FIG. 1A) to the server computer 110 as well. The server computer 190 can be configured to transmit a status request 191 regarding the command 131 to the server computer 110. For example, the server computer 110 can be configured to periodically poll the server computer 110 for updates regarding the command 131. Additionally or alternatively, the server computer 190 can be configured to transmit status requests regarding the command 131 to the server computer 110 on demand.

The server computer 110 can be configured to receive the status request 191, to retrieve the result 161 of the execution from the computer-readable storage 113, and to transmit the result 161 of the execution as part of a response to the server computer 190. For example, the server computer 110 can receive the status request 191, inspect the storage 113 for a current status indicator of the command 131, and determine that the command 131 has finished executing. The server computer 110 can then retrieve the result 161 from the storage 113 and can transmit the result 161 to the server computer 190 as part of a response indicating that the command 131 has been executed. Other types of responses are also possible. For example, if the server computer 110 receives a status request for a command that is not finished executing (or that has not begun executing), the server computer 110 can transmit a response to the server computer 190 indicating that the command is not yet complete.

In at least some embodiments, the server computer 190 can comprise a user interface server (such as a web server) that is configured to present a user interface 193 via one or more user computing devices (not shown). In at least some such embodiments, the server computer 190 can be configured to transmit the command 131 (and/or one or more additional commands) targeting devices in one or more of the computer network's 171-175 based on inputs received from one or more user computer devices. For example, the server computer 190 can be configured to provide a unified user interface through which one or more user computing devices can manage the network devices in the plurality of computer networks 171-175.

In at least some embodiments, it is possible for the server computer to generate one or more commands based on a received command (e.g., 131 and 133). The server computer 110 can then add these generated command(s) to a queue, of the queues 141-145. In some cases, the server computer 110 may add multiple generated commands to multiple queues, of the queues 141-145 that are based on a single received command. For example, the server computer 110 may translate a received command into a different command based on a computer network (e.g., 171, 175, etc.) that is targeted by the command. Additionally or alternatively, the server computer 110 can break a received command down into multiple subcommands. These subcommands can then be added to one or more queues for one or more computer networks targeted by the command.

Although the queues 141-145 are depicted in FIG. 1A as being stored in the server computer 110, it is possible for the queues to be stored in other locations as well. For example, FIG. 1B depicts the queue 141 as being optionally stored in the server computer 110 and/or the storage 113. In at least some embodiments, all or part of one or more of the queues 141-145 can be temporarily buffered in one or more memories of the server computer 110 while the full contents of the queues 141-145 are persisted to the storage 113.

In any of the embodiments described herein, a computer network can comprise a plurality of network devices configured to transmit network packets to one another. Network devices in a computer network can be connected by wired connections, wireless connections, or some combination thereof. Example types of computer networks include local area networks (such as a network local to a data center), wide area networks, remote networks (such as networks located external to a data center containing a server computer or other computing device which communicates with the network), virtual cloud networks (such as networks comprising servers and or virtual machines operating in a cloud computing environment), remote embedded networks (such as remote networks which are hosted by third parties), satellite networks, etc. In any of the examples described herein, managed networks can comprise networks of a same type, of different types, or some combination thereof. Separate networks can be located in a same geographical location or different geographical locations. Separations between networks can be physical, logical, or some combination thereof. Separations between networks can also be based on security protocols designed to isolate and/or control network access. In at least some embodiments, networks of different types can be located in a same domain. However, managing networks located in different domains is also possible.

In any of the embodiments described herein, a network device can be a computing device that is part of a computer network, such as a switch, router, or other type of networking equipment that can process network packets. Such a network device can be part of a larger network of a business or organization (e.g., part of a data center network that can comprise network fabrics, such as multi-tiered network fabrics). A network device can have a number of network ports for connecting to computing devices or other network devices. The connections between ports of network devices may be wired communication cables, such as wired Ethernet cables, fiber optic cables, etc. A computer network can comprise one or more network devices.

Figure 2:
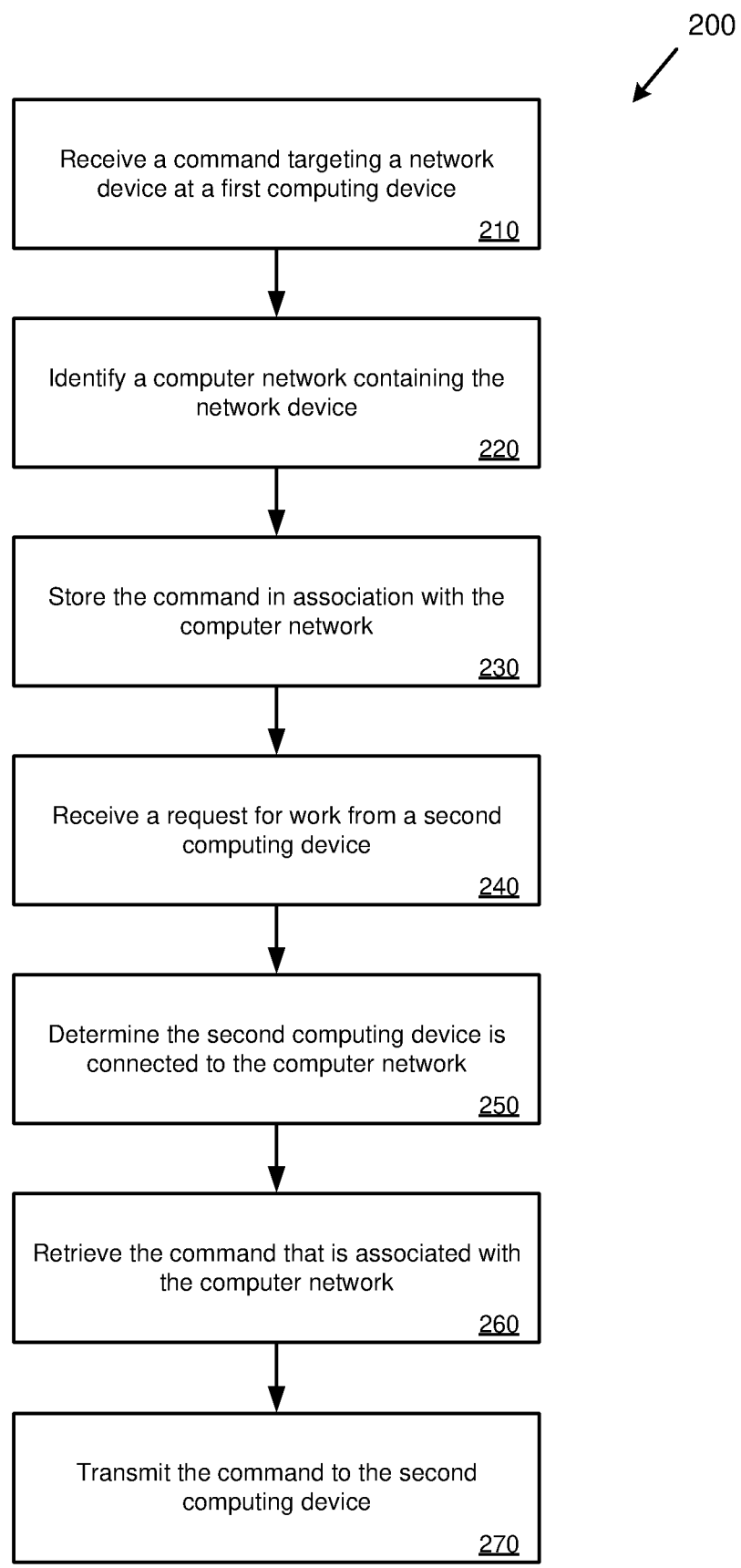
FIG. 2 is a flowchart of an example method for distributed network management.

FIG. 2 is a flowchart of an example method 200 for distributed network management. Any of the example systems described herein can be used to perform all or part of the example method 200. For example, the computing device 310, depicted in FIGS. 3A-B, can be used to perform all or part of the example method 200.

Figure 3A:
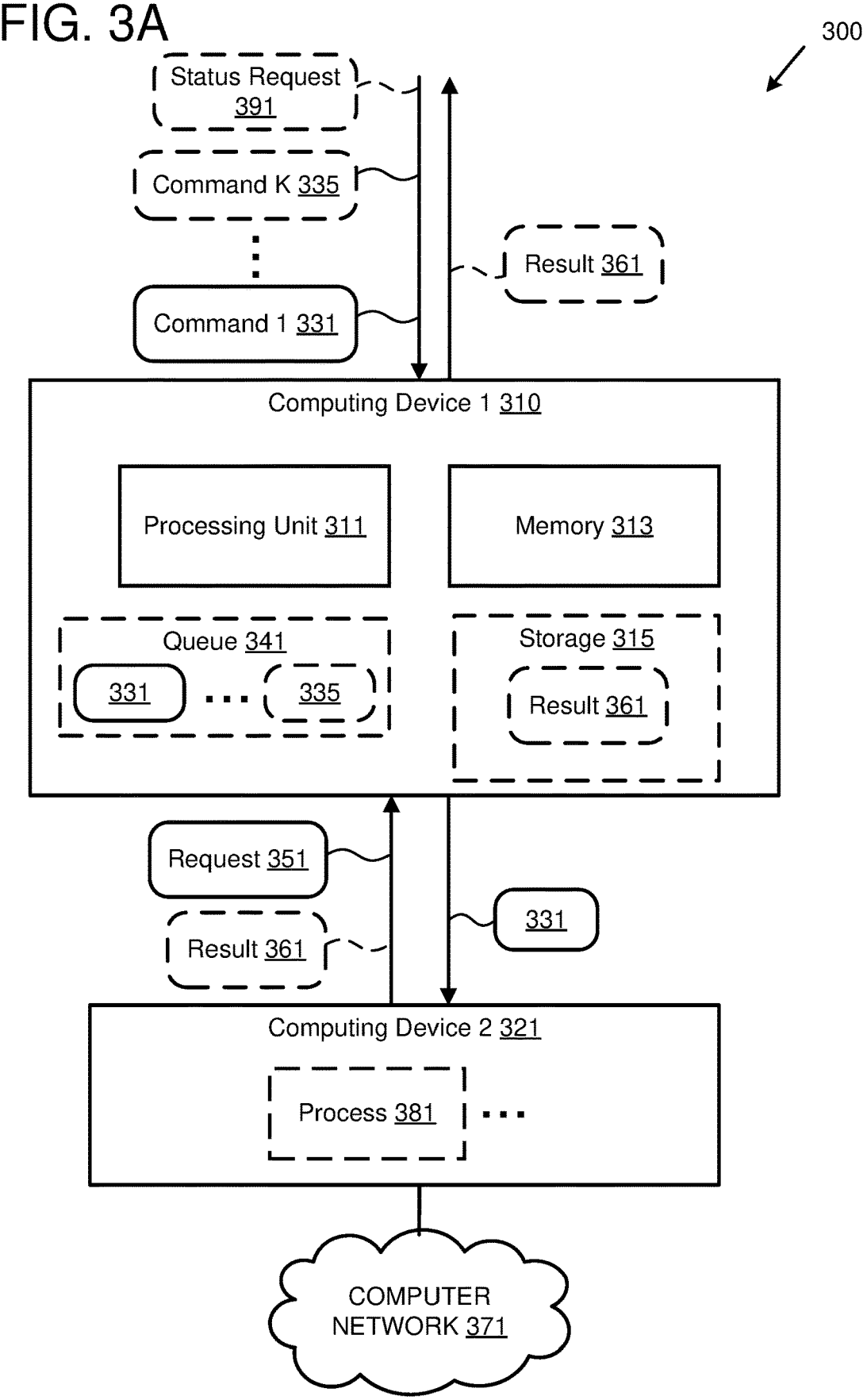
FIGS. 3A-B are system diagrams depicting an example system comprising a computing device configured for distributed network management.

FIG. 3A is a system diagram depicting an example system 300 comprising the computing device 310 configured for distributed network management. The computing device 310 comprises a processing unit 311 and a memory 313. The memory 313 can store instructions that, when executed by the processing unit 311, cause the computing device 310 to perform operations as described herein. Additionally or alternatively, operations described herein can be performed by one or more hardware components of the computing device (such as a field programmable gate array (FPGA), etc.). In at least some embodiments, the computing device 310 further comprises a queue 341 that is associated with a computer network 371.

Referring to FIG. 2, at 210, a command is received at a first computing device, wherein the command targets a network device. For example, the computing device 310 can receive a command 331 that targets a network device (not shown). In at least some embodiments, the network device targeted by a command can be identified in the command, such as by using a name or other identifier associated with the network device. In at least some scenarios, a received command can target more than one network device in a given network. In such an embodiment, a plurality of network devices may be identified by the received command. Alternatively, the command may comprise a network identifier, in which case it may be implied that the command is a command which should be executed against all devices (or all devices to which the command can apply) in a given network.

At 220, a computer network containing the network device is identified. The computer network containing the network device can be identified based on a network device identifier contained in the command. For example, network device identifiers may be assigned using a naming scheme in which a name of a given network device contains a name of a network to which the network device belongs. A computing device receiving the command can thus identify a relevant network for the command by analyzing the network device identifier contained within the command. For example, the computing device 310 can identify the network device targeted by the command 331 and can determine that the network device is part of the computer network 371. Such an identification can be based on a network device identifier contained within the command 331 that contains a name associated with the computer network 371.

At 230, the command is stored in association with the computer network. In at least some embodiments, the command is stored in a queue associated with the computer network. For example, the computing device 310 can store the command 331 in the queue 341 that is associated with the computer network 371. All or part of the queue 341 can be stored in the memory 313 and/or the storage 315 of the computing device 310. Additionally or alternatively, all or part of the queue 341 can be stored in another memory or storage (not shown) of the computing device 310.

In at least some embodiments, the method 200 can further comprise receiving a plurality of additional commands targeting one or more network devices in the computer network. In such an embodiment, the plurality of additional commands can be stored in association with the computer network as well. For example, the plurality of additional commands can be stored in a queue that is associated with the computer network. The one or more additional commands may target the same network device and/or one or more different network devices in the computer network. For example, the computing device 310 can receive one or more additional commands (e.g., 335) targeting one or more network devices in the computer network 371. The computing device 310 can store the one or more additional commands in the queue 341. The one or more additional commands (e.g., 335) may target the same network device as the command 331 and/or one or more different network devices in the computer network 371.

At 240, a request for work is received at the first computing device from a second computing device. For example, the computing device 310 can receive a request for work 351 from a second computing device 321. The computing device 310 and the computing device 321 can be connected via one or more wired and/or wireless communication channels. In at least some embodiments, the computing device 310 and the computing device 321 are connected to a computer network (such as a local area network). However, it is also possible for the computing device 321 to be connected to the computing device 310 via one or more direct connections.

At 250, it is determined that the second computing device is connected to the computer network. Such a determination can be made based on an identifier of the second computing device that is transmitted as part of the request for work. Example identifiers include assigned unique identifiers, IP addresses, MAC addresses, etc. For example, the computing device 310 can determine that the computing device 321 is connected to the computer network 371 based on an identifier contained within the request for work 351.

In at least some embodiments, the second computing device can comprise a process configured to transmit the request for work to the first computing device. In such an embodiment, the identifier contained within the request for work can be an identifier associated with the process instead of, or in addition to, an identifier associated with the second computing device. For example, the computing device 321 can comprise a process 381 that is configured to transmit the request for work 351 to the computing device 310. In such an embodiment, the request for work 351 can contain an identifier associated with the process 381. The computing device 310 can be configured to determine that the process 381 that transmitted the request 381 is associated with the computer network 371 based on an identifier for the process 381 that is included in the request 351.

At 260, the command associated with the computer network is retrieved. In an embodiment where the command is stored in a queue associated with the computer network, the command can be removed from the queue. For example, the computing device 310 can retrieve the command 331 that is associated with the computer network 371. In an embodiment where the command 331 is stored in the queue 341, the computing device 310 can remove the command 331 from the queue 341. In at least some embodiments, removing the command 331 from the queue 341 can comprise updating a front-of-queue pointer to point to a position after the position at which the command 331 is stored. Additionally or alternatively, one or more other commands in the queue 341 can be shifted-up in position within the queue, thereby overwriting the command 331 with the next command in the queue. In such an embodiment, the command 331 can be copied to a temporary buffer before it is overwritten. Other queue data structure implementations are also possible.

At 270, the command is transmitted to the second computing device. For example, the computing device 310 can transmit the command 331 to the computing device 321. The computing device 321 can be configured to receive the command 331 from the computing device 310 and to execute the command 331 against one or more network devices in the computer network 371 that is/are targeted by the command 331. After the command 331 has been executed, the computing device 321 can transmit another request for work (not shown) to the computing device 310. The process of requesting work from the computing device 310, receiving a command (or batch of commands), and executing the command (or batch of commands) against devices in the computer network 371 can continue until the computing device 321 is stopped, one or more processes (e.g., 381) is/are stopped, or some other stop condition is reached.

In at least some embodiments, the computing device 310 comprises one or more processes (e.g., 381) that is/are configured to request commands from the computing device 310, and to execute received commands against devices in one or more computer networks (e.g., 371). For example, the computing device 321 can comprise a process 381 that is configured to transmit the request 351 to the computing device 310, receive the command 331 from the computing device 310, and execute the command 331 against one or more network devices in the computer network 371. In at least some cases, using multiple processes can increase a rate at which commands are processed from the queue 341 and executed against devices in the computer network 371.

The method 200 can further comprise receiving a result of an execution of the command from the second computing device, and storing the result of the execution in a storage connected to the first computing device. For example, the computing device 321 (or a process running on the computing device 321 (e.g., 381)) can be configured to transmit a result 361 of the execution of the command 331 to the computing device 310. The computing device 310 can be configured to receive the result 361 and to store the result in a storage connected to the computing device 310. In at least some embodiments, the computing device 310 comprises a computer-readable storage medium 315. In such an embodiment, the computing device 310 can store the result 361 of the execution of the command 331 in the computer-readable storage medium 315.

The method 200 can further comprise receiving a request for a result of the command at the first computing device, retrieving the result of the execution of the command from the storage, and transmitting the result of the execution as part of a response to the request. For example, the computing device 310 can receive a status request 391 for the command 331. The computing device 310 can retrieve the result 361 of the execution of the command 331 from the computer-readable storage medium 315 (or another storage connected to the computing device 310) and can transmit the result 361 of the execution as part of a response to the status request 391.

The method 200 can further comprise receiving a second command at the first computing device, wherein the second command targets the network device and/or another network device in the computer network, and storing second command in association with the computer network. For example, the second command can be stored in a queue associated with the computer network. In at least some embodiments, an order in which the commands are processed can be based on priorities of the commands. For example, it can be determined by the first computing device that the second command has a higher priority than the first command. In such a scenario, the second command can be transmitted to the second computing device before the first command. For example, the computing device 310 can be configured to store the command 331 and the command 335 in the queue 341 for the computer network 371. When a request for work (e.g., 351) is received from a computing device (e.g., 321) that is connected to the computer network 371, the computing device 310 can determine which command to remove from the queue 341 and transmit to the computing device (e.g., 321) based on relative priorities of the commands. Such priorities can be based on priority indicators contained within the commands, command types associated with the commands, origin identifiers for the commands, service level agreements associated with senders of the commands, etc. Other strategies for determining command priority are also possible. In at least some embodiments, relative priorities of the commands can be evaluated when commands are added to the queue. For example, when a command is added to a queue, a position of the command within the queue can be based on its relative priority as compared to other commands in the queue.

In at least some embodiments, the method 200 can comprise creating one or more processes on the second computing device that are configured to transmit requests for work to the first computing device, receive commands from the first computing device, and to execute the received commands against one or more network devices in the computer network to which the second computing device is connected. For example, the computing device 321 can be configured to create one or more processes (e.g., 381) that is/are configured to transmit requests for work (e.g., 351) to the computing device 310, receive commands (e.g., 331 and 335) from the computing device 310, and to execute the received commands against one or more network devices in the computer network 371.

The example method 200 can further comprise determining that a number of commands stored in association with the computer network exceeds a specified threshold. For example, in an embodiment where commands are stored in a queue associated with the computer network, it can be determined that a number of commands stored in the queue exceeds the specified threshold. Based on the determining, one or more additional processes can be created on the second computing device or another computing device connected to the computer network. For example, the command and one or more additional commands targeting one or more network devices in the computer network can be received at the first computing device. The first computing device can store the command and the one or more additional commands in association with the computer network. The first computing device can determine that a current number of commands associated with the computer network that are pending (e.g., a number of command current in the queue associated with the computer network) has exceeded a specified threshold. The first computing device can transmit one or more commands to the second computing device (and/or one or more other computing devices connected to the computer network) to create additional processes that are configured to transmit additional requests for work to the first computing device. For example, the computing device 310 can determine that a current number of commands (e.g., 331-335) in the queue 341 exceeds a specified threshold. Based on this determining, the computing device 310 can transmit one or more commands (not shown) to the computing device 321 (and/or one or more other computing devices connected to the computer network 371) to create additional processes. These additional processes can be configured to transmit additional requests for work (not shown) to the computing device 310. Thus, in at least some scenarios, by creating additional processes, the computing device 310 may be able to increase a rate at which commands targeting the computer network 371 are processed from the queue 341.

Referring to FIG. 2, in at least some embodiments, the request for work is received from a process executing on the second computing device. In such an embodiment, the example method 200 can further comprise determining whether the process has authorization to execute the command. Such a determination can be made, for example, based on a security configuration that can be accessed by the first computing device. For example, the command may target a network (or a device within a network) to which access is restricted to specified computing devices (and/or specified processes within specified computing devices). In such a scenario, the first computing device can determine whether or not the process that transmitted the request for work has sufficient security rights to execute the command. If the first computer determines that the process has authorization to execute the command then, based on at least in part on the determining, the command can be retrieved from the queue and transmitted to the process. However, if the first computer determines that the process does not have sufficient authorization to execute command, then the command is not transmitted to the process. In at least some embodiments, the first computing device can attempt to find another command in the queue which can be executed by the process and transmit that another command to the process instead.

Additionally or alternatively, the command can be evaluated using a security configuration before it is stored in association with the network. For example, it can be determined whether a sender of the command is authorized to target the computer network or an identified network device with the command. In at least some scenarios, security permissions can be defined which grant access based on command types, identities of senders of commands, network identities, network device identities, or some combination thereof. If it is determined that the sender of the command is not authorized, then the command can be rejected. However, if the sender is authorized, then the command can be accepted and stored in association with the computer network.

For example, the computing device 310 can be configured to determine whether a sender of the command 331 is authorized to target a network device identified in the command 331 with the command. Such a determination can be based on a security configuration (not shown) which defines access permissions for executing commands against the computer network 371. Such access permissions can define access rights based on command types, sender identities, network identifiers, network device identifiers, or some combination thereof. Example sender identities include IP addresses, MAC addresses, and/or user identifiers. Other types of identifiers that can be associated with a sender of a command can be used as well. In at least some embodiments, a sender identifier is included in the command 331. In such embodiments, the computing device can be configured to reject commands that do not include sender identifiers. If the computing device 310 determines that the sender of the command 331 is authorized, then the computing device 310 can stored the command 331 in association with the computer network 371 (for example, by storing the command 331 in the queue 341). However, if the computing device 310 determines that the sender is not authorized, then the computing device 310 can reject the command.

The example method 200 can further comprise receiving a second command at the first computing device, wherein the second command targets a second network device. The first computing device can determine that the second network device is in a second computer network and can store the second command in a second queue associated with the second network.

Figure 3B:
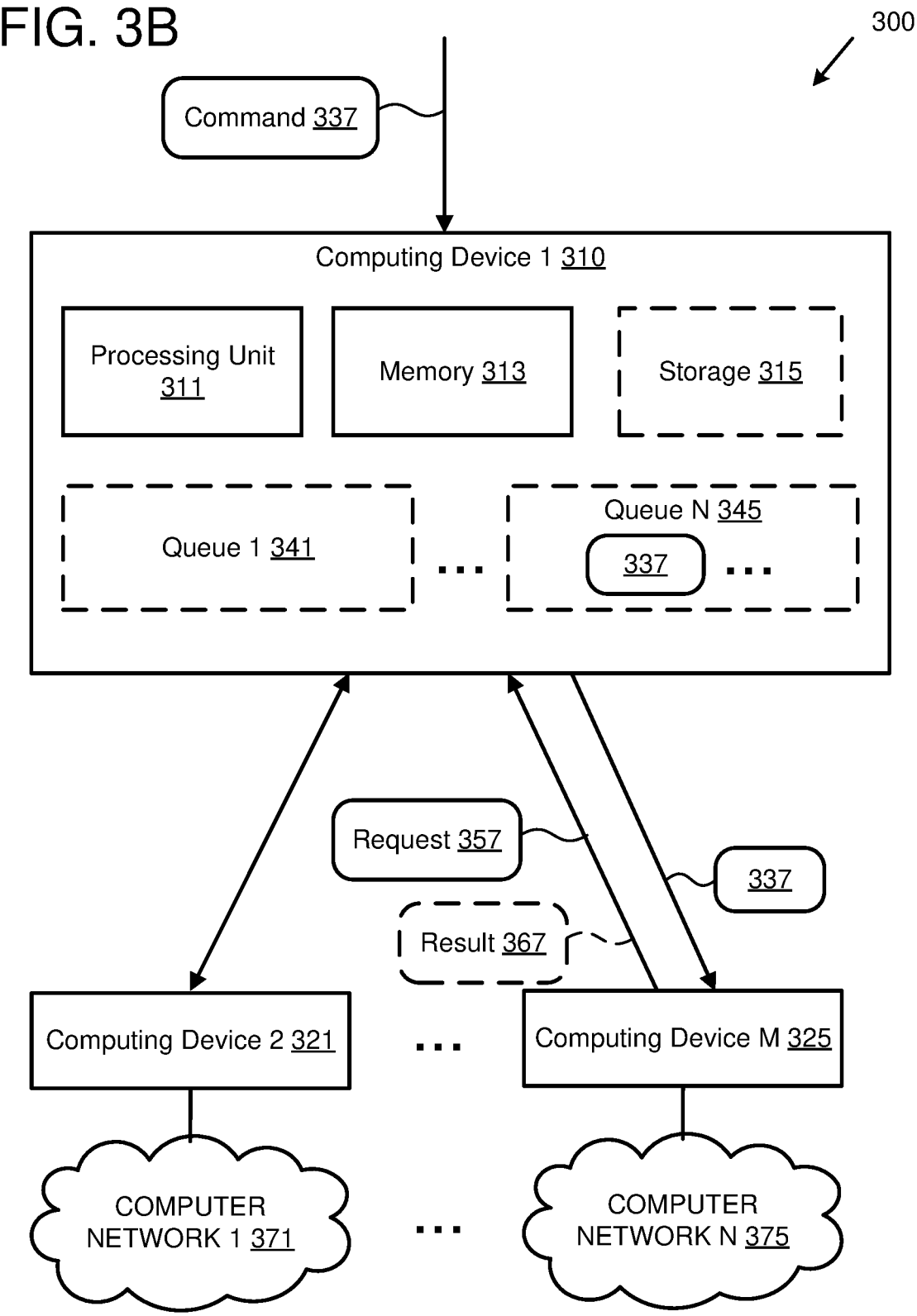

Referring to FIG. 3B, an embodiment of the example system 300 is depicted in which the computing device 310 is configured for distributed network management of multiple computer networks 371-375. The computing device 310 is configured to receive another command 337 that targets a networking device in another network of the plurality of networks 371-375. In the particular scenario depicted in FIG. 3B, the command 337 targets a network device in the computer network 375. The computing device 310 can determine that the network device targeted by the command 337 is part of the computer network 375 and can store the command 337 in association with the computer network 375. In at least some embodiments, the computing device 310 can be configured to store the command 337 in a queue 335 associated with the computer network 375. The computing device 310 can receive a request for work 357 from the computing device 325 that is connected to the computer network 375. The computing device 310 can determine that the computing device 325 is connected to the computer network 375 and can retrieve the command 337 (for example, by removing the command 337 from the queue 345 associated with the computer network 375). The computing device 310 can then transmit the command 337 to the computing device 325.

The computing device 325 can be configured to receive the command 337 and to execute the command 337 against one or more network devices in the computer network 375 that is/are targeted by the command 337. In at least some embodiments, the computing device 325 can transmit a result of the execution of the command 337 to the computing device 310. In such an embodiment, the computing device 310 can store the result 367 in the computer-readable storage 315 (or another storage connected to the computing device 310).

Additionally or alternatively, the computing device 325 can comprise a process (not shown) that is configured to transmit the request 357 to the computing device 310, receive the command 337 from the computing device 310, and execute the command 337. In at least some embodiments, the computing device 325 can comprise a plurality of processes that are configured to transmit requests for work to the computing device 310 and to execute received commands against one or more network devices in the computer network 375. Although a single computing device (325) is depicted in FIG. 3B, it is possible for multiple computing devices to be connected to a given network. Additionally or alternatively, it is possible for a computing device (and/or processes running on a computing device) to be connected to more than one computer network.

Figure 4:
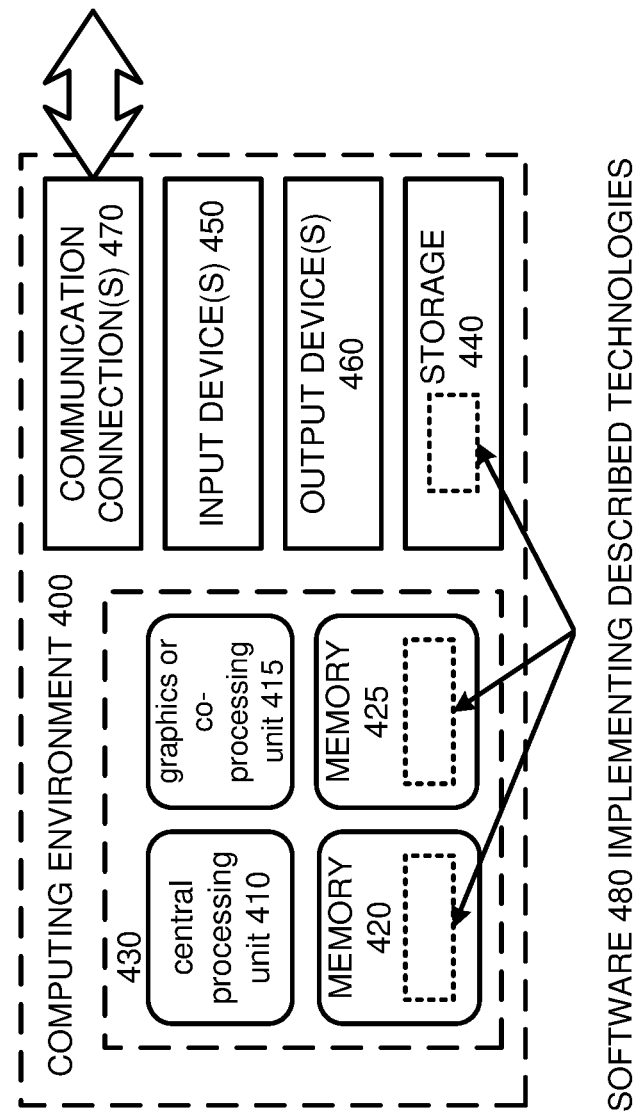
FIG. 4 is a diagram depicting a generalized example of a suitable computing environment in which the described innovations may be implemented.

FIG. 4 depicts a generalized example of a suitable computing environment 400 in which the described innovations may be implemented. The computing environment 400 is not intended to suggest any limitation as to scope of use or functionality, as the innovations may be implemented in diverse general-purpose or special-purpose computing systems. For example, the computing environment 400 can be any of a variety of computing devices (e.g., desktop computer, laptop computer, server computer, tablet computer, etc.).

With reference to FIG. 4, the computing environment 400 includes one or more processing units 410, 415 and memory 420, 425. In FIG. 4, this basic configuration 430 is included within a dashed line. The processing units 410, 415 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 4 shows a central processing unit 410 as well as a graphics processing unit or co-processing unit 415. The tangible memory 420, 425 may be volatile memory (e.g., registers, cache, RAM), non-volatile memory (e.g., ROM, EEPROM, flash memory, etc.), or some combination of the two, accessible by the processing unit(s). The memory 420, 425 can store software 480 implementing one or more innovations described herein, (for example, in the form of computer-executable instructions suitable for execution by the processing unit(s)). In at least some embodiments, the computing environment 400 can comprise a computing device, server computer, or network device as described herein.

A computing system may have additional features. For example, the computing environment 400 includes storage 440, one or more input devices 450, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The tangible storage 440 may be removable or non-removable, and includes magnetic disks, magnetic tapes or cassettes, CD-ROMs, DVDs, or any other medium which can be used to store information in a non-transitory way and which can be accessed within the computing environment 400. The storage 440 can store instructions for the software 480 implementing one or more innovations described herein (for example in a storage medium and/or firmware of the storage 440). In at least some embodiments, the tangible storage 440 can comprise one or more computer-readable storages as described herein.

The input device(s) 450 may be a touch input device such as a keyboard, mouse, pen, or trackball, a voice input device, a scanning device, or another device that provides input to the computing environment 400. The output device(s) 460 may be a display, printer, speaker, CD-writer, or another device that provides output from the computing environment 400.

The communication connection(s) 470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-Specific Integrated Circuits (ASICs), Program-Specific Standard Products (ASSPs), System-On-a-Chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
    a first server computer, comprising a first queue associated with a first computer network and a second queue associated with a second computer network, wherein the first server computer is configured to:
        receive a first command, wherein the first command targets a network device in the first computer network,
        store the first command in the first queue associated with the first computer network,
        receive a second command, wherein the second command targets a network device in the second computer network,
        store the second command in the second queue associated with the second computer network,
        receive a request for work from a second server computer, wherein the request includes an identifier of the first computer network and wherein the second server computer is positioned between the first server computer and the first computer network,
        determine that the second server computer is associated with the first computer network using the identifier,
        retrieve the first command from the first queue, and
        transmit the first command to the second server computer; and
    the second server computer, wherein the second server computer comprises a worker process that is configured to:
        transmit the request for work to the first server computer, wherein the request includes the identifier of the first computer network,
        receive the first command from the first server computer, and
        execute the first command against the network device in the first computer network.

2. The system of claim 1, further comprising a third server computer, wherein the third server computer is associated with the second computer network and comprises a worker process that is configured to:
    transmit another request for work to the first server computer;
    receive the second command from the first server computer; and
    execute the second command against the network device in the second computer network.

3. The system of claim 1, further comprising a third server computer that is configured to:
    transmit the first command and the second command to the first server computer; and
    present a user interface via a user computing device.

4. The system of claim 3, wherein:
    the system further comprises a computer-readable storage connected to the first server computer; and
    the first server computer is further configured to:
        receive a result of the execution of the command from the second server computer,
        store the result of the execution in the computer-readable storage,
        receive a status request regarding the first command from the third server computer,
        retrieve the result of the execution from the computer-readable storage, and
        transmit the result of the execution as part of a response to the third server computer.

5. The system of claim 1, wherein the second server computer comprises one or more additional worker processes configured to transmit requests for work to the first server computer.

6. The system of claim 5, wherein the first server computer is configured to transmit a command to the second server computer to create the one or more additional worker processes.

7. A method, comprising:
    receiving a command at a first computing device, wherein the command targets a network device;
    identifying, by the first computing device, a computer network containing the network device;
    storing, by the first computing device, the command in association with the computer network;
    receiving a request for work at the first computing device from a second computing device, wherein the request for work includes an identifier of the computer network coupled to the second computing device and wherein the second computing device is positioned between the first computing device and the computer network;
    determining, by the first computing device, that the second computing device is connected to the computer network using the identifier;
    retrieving the command associated with the computer network; and
    transmitting the command to the second computing device;
    wherein the method further includes creating a process on the second computing device that is configured to transmit the request for work to the first computing device, receive the command from the first computing device, and execute the command against the network device in the computer network.

8. The method of claim 7, further comprising:
receiving a plurality of additional commands targeting one or more network devices in the computer network; and
storing the plurality of additional commands in association with the computer network.

9. The method of claim 8, further comprising:
determining that a number of the additional commands stored in association with the computer network exceeds a specified threshold; and
based on the determining, creating one or more additional processes on the second computing device or another computing device connected to the computer network.

10. The method of claim 7, further comprising:
receiving a result of an execution of the command from the second computing device;
storing the result of the execution in a storage connected to the first computing device;
receiving a request for a result of the command at the first computing device;
retrieving the result of the execution of the command from the storage; and
transmitting the result of the execution as part of a response to the request.

11. The method of claim 7, wherein:
the command is a first command; and
the method further comprises:
receiving a second command at the first computing device, wherein the second command targets the network device, or another network device in the computer network;
storing the second command in association with the computer network;
determining, by the first computing device, that the second command has a higher priority than the first command; and
transmitting the second command to the second computing device before transmitting the first command to the second computing device.

12. The method of claim 7, wherein: the command is a first command, the network device is a first network device, and the computer network is a first computer network; and the method further comprises: receiving a second command at the first computing device, wherein the second command targets a second network device; determining, by the first computing device, that the second network device is in a second computer network; and storing the second command in association with the second computer network.

13. The method of claim 7, wherein:
the request for work is received from a process executing on the second computing device; and
the method further comprises:
determining, based on a security configuration, that the process has authorization to execute the command; and
based at least in part on the determining, retrieving the command and transmitting it to the process.

14. A computing device, comprising:
a queue associated with a computer network;
a processing unit; and
a memory storing instructions that, when executed by the processing unit, cause the computing device to perform operations, the operations comprising:
receiving a command targeting a network device;
determining that the network device is part of the computer network;
storing the command in the queue associated with the computer network;
receiving a request for work from another computing device, wherein the request includes an identifier of the computer network;
determining that the another computing device is connected to the computer network using the identifier of the computer network;
removing the command from the queue associated with the computer network; and
transmitting the command to the another computing device; and
wherein the operations further comprise creating a process on the another computing device, wherein the process is configured to transmit the request for work to the computing device, receive the command from the computing device, and execute the command against the network device that is part of the computer network.

15. The computing device of claim 14, wherein the operations further comprise:
receiving a plurality of additional commands targeting one or more network devices that are part of the computer network; and
adding the plurality of additional commands to the queue associated with the computer network.

16. The computing device of claim 15, further comprising:
determining that a number of the additional commands in the queue exceeds a specified threshold; and
based on the determining, creating one or more additional processes on the another computing device.

17. The computing device of claim 14, wherein:
the computing device further comprises a computer-readable storage medium; and
the operations further comprise:
receiving a result of an execution of the command from the another computing device;
storing the result of the execution in the computer-readable storage medium;
receiving a status request for the command;
retrieving the result of the execution of the command from the computer-readable storage medium; and
transmitting the result of the execution as part of a response to the status request.

18. The computing device of claim 14, wherein the operations further comprise:
determining, based on a security configuration, that a transmitter of the command is authorized to target the network device with the command; and
storing the command in the queue associated with the computer network based on the determining.

* * * * *